United States Patent [19]
Cook

[11] 3,768,894
[45] Oct. 30, 1973

[54] PHOTOGRAPHIC CASSETTE CONTAINING FILM STRIP PROGRAMMED FOR MANUAL AND AUTOMATIC OPERATION AND FILM PROCESSOR THEREFOR

[75] Inventor: Gerald H. Cook, Lynnfield, Mass.
[73] Assignee: Polaroid Corporation, Cambridge, Mass.
[22] Filed: June 12, 1972
[21] Appl. No.: 262,045

[52] U.S. Cl. .................. 352/130, 95/90.5, 352/241
[51] Int. Cl. .......................................... G03c 11/00
[58] Field of Search .................. 95/13, 89 R, 90.5; 352/72, 78 R, 130, 236, 241

[56] References Cited
UNITED STATES PATENTS
3,667,361  6/1972  Meggs et al. .................... 95/90.5 X

*Primary Examiner*—Fred L. Braun
*Attorney*—John W. Ericson et al.

[57] ABSTRACT

A photographic cassette containing a strip of film and a film processor comprising a supply of processing composition and a device for applying the composition to the film. The film is formed with actuating elements cooperating with the film processor, with a camera, and with a film drive and projection system to advance the film for exposure, process the exposed film, project the processed film, and rewind the film for storage. Visible indicia on the film are sequentially exposed in a film gate formed in the cassette and cooperate with the actuating elements to inform the operator of the current status of the film in the cassette before it is placed in the camera, after it is removed from the camera, and after it is removed from the film drive and projection system.

17 Claims, 5 Drawing Figures

Patented Oct. 30, 1973  3,768,894

PHOTOGRAPHIC CASSETTE CONTAINING FILM STRIP PROGRAMMED FOR MANUAL AND AUTOMATIC OPERATION AND FILM PROCESSOR THEREFOR

This invention relates to photography, and particularly to a novel cassette comprising a film strip programmed for combined manual and automatic manipulation.

Photographic systems for motion picture photography have been developed in which photosensitive material in the form of an elongated film strip is packaged in a cassette containing processing composition, together with processing means operable to coat the composition on the film so that motion pictures may be processed and projected without the aid of a darkroom immediately after the exposure of the film in a camera. One system that has been proposed for this purpose is disclosed in copending U. S. Application for Letters Patent Ser. No. 227,080, filed on Feb. 17, 1972 by Edwin H. Land for Photographic System for Processing and Projecting Transparencies, and assigned to the assignee of this application.

The system disclosed in the above cited application Ser. No. 227,080 comprises, as the key element, a replaceable film cassette. The cassette contains a strip of film, a supply of processing composition for the film, and an internally programmed processor responsive to manipulation of the film in the cassette for applying the processing composition to the film after its exposure. One form of cassette suitable for use in accordance with the invention is shown and described in the aforesaid application Ser. No. 227,080. Another suitable form of cassette is shown and described in copending U. S. Application for Letters Patent Ser. No. 227,092, filed on Feb. 17, 1972 for Processing Composition Release Mechanism for Film Cassette Comprising Self-Contained Film Processing System by John F. Batter, Jr., Paul B. Mason, Joseph A. Stella, Paul W. Thomas and Joseph H. Wright, and assigned to the assignee of this application.

The cassette is adapted to be inserted in a camera, for exposure of the film. After exposure, it is inserted into a viewer comprising a film drive and projection system. This system comprises a receptacle configured to receive the cassette, and cyclic drive apparatus for manipulating the film in the cassette. The film is manipulated in a sequence determined by a signal provided by the cassette that indicates whether or not the film has been processed.

In response to the insertion of a cassette containing unprocessed film, the film drive and projection apparatus manipulates the film in the cassette in a lighttight environment. That movement of the film activates the processor, developing the film to produce a series of fixed, visible, projectable images. Thereafter, the apparatus manipulates the film in an optical system, causing it to be projected for viewing. The film is then rewound, for storage and subsequent reuse. Finally, the cassette is ejected. In response to the insertion of a cassette containing processed film, the viewer simply projects the film, rewinds it, and then ejects the cassette.

It will be apparent from the above description that a cassette of the kind described undergoes several manipulations in the course of its transformation from a container of unexposed film to a container or processed film ready for projection. Following each of those manipulations, the cassette is in a different state, but does not change in external appearance. Thus, absent special precautions, it is possible to place a cassette of processed film in the camera, and waste a filming session, or to place a cassette of unexposed film in the viewer and waste the film. The objects of this invention are to facilitate the proper use of cassettes containing film processors, and to avoid handling a cassette in one state in a manner appropriate only for a cassette in another state.

Briefly, the above and other objects of the invention are attained by the construction of a cassette containing a film strip arranged to be moved through a film gate in the cassette between first and second positions separated by most of the length of the film for exposure in a camera. The cassette contains a self-programmed processing system responsive to film movement between third and fourth positions on either side of the first two positions and consequently separated by a greater length of film. Actuating means for effecting sequential operation of the processor are formed on the film adjacent the third and fourth positions, each engaging the processor as the film reaches the corresponding position. Visible indicia formed on the film adjacent each of the first and second positions, each in position to be visible in the film gate when the film is in the corresponding first or second position, but to be out of the film gate, and thus not visible, in the third and fourth positions. A first of the indicia, visible before the cassette is placed in the camera, indicates that the film is unexposed. The second indicia, visible when the cassette is removed from the camera after all of the photographically useful portion has been exposed, indicates that the film is exposed. When placed in the viewer, then processed, projected, rewound, and finally ejected, neither indicia is visible in the film gate. That may be taken as an indication that the film has been exposed, processed and projected, and is ready for reuse in the viewer. Alternatively, an explicit indication, such as the legend "PROCESSED", "DEVELOPED", or the like, may be formed on the film in position for display in the film gate after the film has been rewound in the viewer. That provides an explicit indication to distinguish from a cassette that has been removed from the camera when partially exposed.

More specifically, a cassette in accordance with the invention comprises a lighttight housing containing a pair of storage reels on which a strip of film is disposed, extending from one reel to the other over a path including a film gate in the housing through which a portion of the film is exposed for cooperation with a camera, and with the film drive and projection system. The film is initially unexposed, and coiled primarily about one of the reels hereinafter referred to as the supply reel. In this position, the legend "UNEXPOSED" is visible in the film gate. The other reel, to be referred to as the takeup reel, is connected to the other end of the film, and is adapted to store the film as it is advanced from the supply reel during exposure, or during subsequent manipulations in the film drive and projection system.

The cassette contains a processing system that is initially latched into an inactive state by a detent that is released when the cassette is inserted in the film drive and projection system. A singularity is provided on the film, preferably comprising a hook formed on the film near the end connected to the supply reel. In response to movement of the film toward the takeup reel beyond an exposure termination point established in the camera, the hook engages and releases a pressure pad that then resiliently urges the film into contact with a coating nozzle.

The film is provided, along at least one edge, with a regularly spaced series of conventional sprocket holes to enable the film to be incrementally advanced onto the takeup reel during exposure or projection. This series of sprocket holes is interrupted at a first point by a first elongated sprocket hole that serves to terminate advance of the film in the camera. When exposure is so terminated, the legend "EXPOSED" is visible in the film gate.

A second sprocket hole is provided, of greater length than the first, which serves a similar purpose in the film drive and projection system by terminating advance of the film at a point beyond the exposure termination point established in the camera. When film advance is terminated at that second termination point, the legend "EXPOSED" is no longer visible in the film gate.

When the film drive and projection system has advanced the film to the second termination point established by the second elongated sprocket hole, it is then rewound. In the rewound position of the film, the legend "UNEXPOSED" is not visible in the film gate, but a legend "PROCESSED" may be formed on the film in position to be visible in the film gate when the film is rewound.

A pair of contacts on the cassette produce a signal, in a manner described in the above copending applications, that indicate whether or not the film has been processed. This signal is sensed by the film drive and projection system when the cassette is inserted into it. If the film has not been processed, rewinding takes place in three stages. As the first step, a short length of the film is drawn onto the supply reel, causing rotation of the supply reel in the rewind sense for the first time since the manufacture of the cassette. Rotation of the supply reel in that sense activates a release mechanism, enabled by the insertion of a cassette in the film drive and projection system, to release the processing composition in preparation for developing the film.

A short interval of time is then allowed to elapse during which the film is motionless. That allows the processing composition to find its way into the coating nozzle. Thereafter, the film is rewound onto the supply reel, while continuously moving past the coating nozzle as the processing composition is applied to it in a thin, uniform coat. Towards the end of this process, as the film nears its end on the takeup reel, another singularity in the film, which may take the form of an aperture in the film near the end connected to the takeup reel, engages the processor and causes the pressure pad to be cammed out of engagement with the film and latched into a storage position, while closing the coating nozzle aperture.

The film drive and projection system includes a drive mechanism coupled to the supply and takeup reels through slip clutches. As the end of the film is reached on the takeup reel, these shafts slip, and this cessation of motion is sensed to cause the drive system to advance to a projection mode of operation.

In that mode, a snubber reel in the cassette is engaged to prevent motion of the film onto the takeup reel except as it is incrementally advanced by a drive pawl that sequentially engages the sprockets in the edge of the film. A projection lamp is turned on and directs light through the film to a lens that focuses images from the processed film onto a screen provided as a part of the projection system. The finished film is thus projected for viewing within approximately a minute after the insertion of the exposed film into the film drive and projection system.

At the end of the projection cycle, the film is rapidly rewound onto the supply reel. The cassette is then automatically ejected. Had the film in the cassette been processed prior to its last insertion in the system, operation would commence with projection of the film, and conclude by rewinding the projected film onto the supply reel, and ejecting the cassette as before.

The system of the invention, the manner in which its components are constructed, and their mode of operation, will best be understood in the light of the following description, together with the accompanying drawings, of a preferred embodiment thereof.

Figures 1, 2, 3, 4:
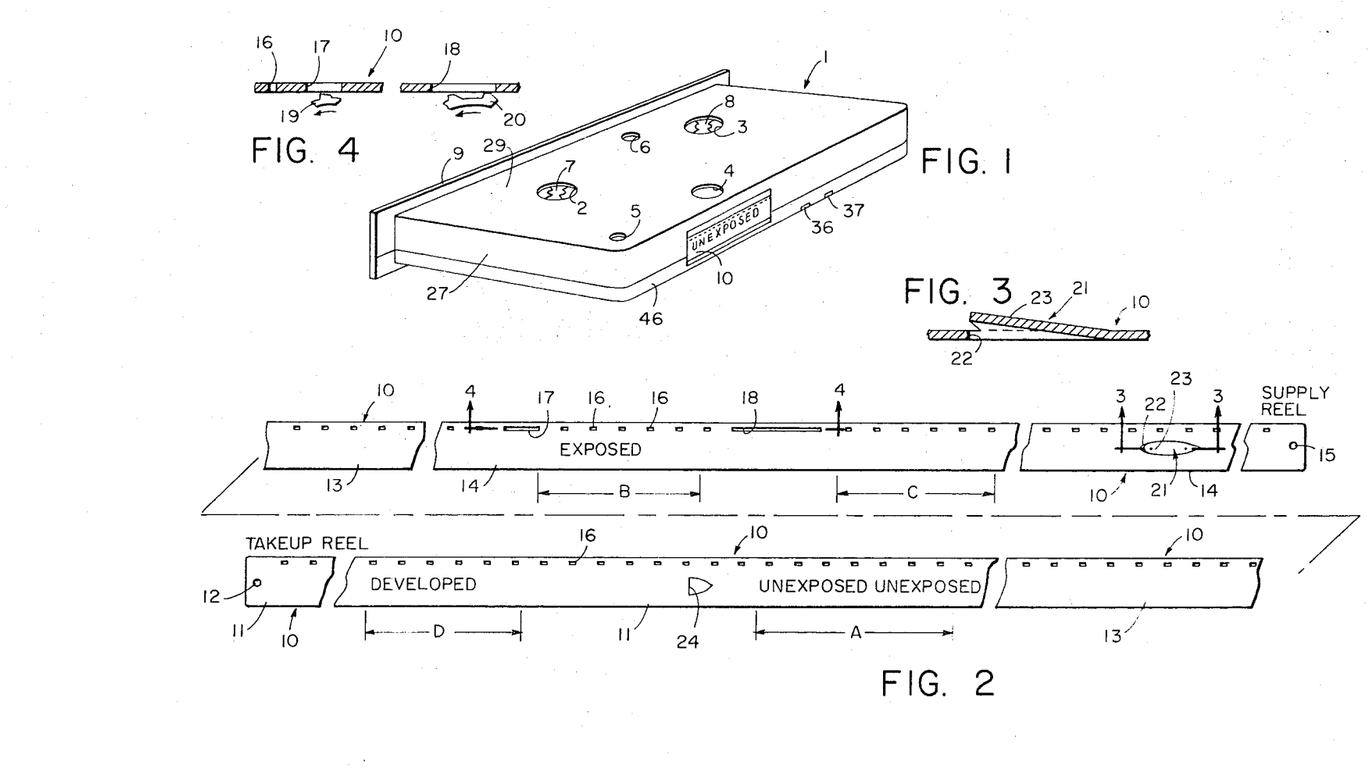
FIG. 1 is a schematic perspective sketch of a cassette in accordance with the invention.
FIG. 2 is a fragmentary schematic plan sketch of a film strip suitable for use in the cassette of FIGS. 1 and 5, with parts broken away.
FIG. 3 is a schematic cross-sectional view of a portion of the film strip of FIG. 2, taken substantially along the lines 3—3 in FIG. 2.
FIG. 4 is a schematic cross-sectional view of a portion of the film strip of FIG. 2, taken substantially along the lines 4—4 in FIG. 2 and shown in association with single and double drive pawls.

FIG. 1 shows a cassette 1 provided with a number of light-baffled openings, 2, 3, 4, 5 and 6. These openings expose parts adapted to cooperate with corresponding parts of the film drive and projection system to perform various functions in the cassette. Thus, a sprocket 7 formed on the takeup reel is accessible through the opening 2. A similar drive sprocket 8 formed on the supply reel is accessible through the opening 3. Projection light is at times admitted to the cassette through the opening 4. A stop can enter, to brake a snubber roll forming a part of the cassette, through the opening 5. The opening 6 serves to admit a locating pin, forming a part of the film drive and projection system, to register the presence of a cassette in the system, to latch the cassette in position for manipulation, and to enable the processing apparatus in a manner described in detail in the above cited copending application Ser. No. 227,092. Alternatively, the modified form of enabling mechanism shown in the above-cited copending application Ser. No. 227,080 may be employed, with a suitable change in the location of the opening 6 to correspond with that shown in application Ser. No. 227,080.

A flange 9 is formed on the upper end of the cassette 1. This flange aids in grasping the cassette while inserting it in, or removing it from, a pocket formed in a film drive and projection system, such as that shown and described in the above-cited application Ser. No. 227,080. It also helps to fix the cassette in position in the film drive and projection system, by engagement with the rim of the pocket.

The cassette contains a strip of film 10, to be described in more detail below. A portion of the strip 10 is exposed in a film gate formed in the housing, through which the film enters and leaves the housing for cooperation with a camera, and with a film drive and projection system. As shown in FIG. 1, in the initial position of the film 10 in the cassette, a legend "UNEXPOSED" formed on the non-emulsion side of the film appears in the film gate.

The photographic system of the invention preferably makes use of a photofinishing process in which a strip of film, following exposure in the camera, is contacted with a single processing composition to form a finished transparency from the latent image or images formed on the film during its exposure. The physical construction of such film, the nature of the photosensitive coating thereon, and suitable processing compositions therefor, are described in the above-cited copending application Ser. No. 227,080. However, the film strip is modified in accordance with the invention in a manner next to be described.

Referring to FIG. 2, there is shown a film strip generally designated 10, which comprises a leader 11 terminating at an end formed with an aperture such as 12. The aperture 12 serves to connect that end of the film to a takeup reel in the cassette 1.

Behind the leader, which may be in the neighborhood of 18 inches in length, there is a strip 13 of photographically useful film, upon which projectable images may be formed. The strip 13 may be, for example, approximately 45 feet in length for 8mm film.

Following the photographically useful portion of the film is a trailer region generally designated 14. The trailer 14 terminates at another end formed with an aperture 15 by means of which that end of the film is adapted to be connected to a supply reel in the cassette 1.

The film 10 may comprise a base of any suitable transparent material of the kind conventionally used for film bases. On this base is applied, at least over the central portion of the photographically useable length 13 of the film 10, a photosensitive emulsion, whereon a series of latent images may be formed with a camera. The photosensitive emulsion is preferably of one of the forms, described in the above-cited copending application, which can subsequently be processed to form a projectable image on the film base.

The film 10 is formed along one edge with sprocket holes such as 16 at regular intervals adapted to cooperate with a drive pawl, in a manner to be described, in either camera or projector, for incremental advancement of the film. The series of sprocket holes 16 adjacent the trailing end of the film may be interrupted by a first elongated sprocket hole 17. This elongated hole 17 may span, for example, two of the sprocket holes 10.

Further along the film, in the direction of the supply reel end, the series of sprocket holes 16 is again interrupted by a second elongated sprocket hole 18, longer than the sprocket hole 17 and, for example, spanning three of the sprocket holes 16. As will appear, the first elongated sprocket hole 17 establishes an exposure end point in the camera, whereas the second sprocket hole 18 determines a film takeup termination point in the film drive and projection apparatus.

Basically, termination of film advance at the first elongated sprocket hole 17 is attained by the use of a single drive pawl in the camera, such as the pawl 19 in FIG. 4, which sequentially engages the sprocket holes 16, to advance the film by one frame length at each engagement, in a conventional manner. Toward the end of each such advance stroke, as is conventional, the pawl is cammed down out of engagement with the film. When the single pawl engages the elongated aperture 17, the camming down movement occurs before the film engages the leading edge of the elongated hole, and therefore the pawl may cycle repeatedly without further advance of the film. This serves to effect a termination of film advance for the purposes of exposure adjacent the end of the region of photographically useful emulsion, to alert the photographer, by the somewhat different sound produced when the pawl skips the film, that his cassette should be replaced.

The film drive and projection system is provided with a double pawl, comprising two integral pawls spaced apart by one frame length as shown at 20 in FIG. 4, each pawl being of the same shape as the single pawl in the camera. When the first elongated aperture 17 is encountered, the trailing pawl of the pair serves to engage the leading edge of the aperture 17 to cause the film to be advanced without interruption. For normally spaced sprocket holes 16, both of the pawls engage the film in sequential sprocket holes. However, when the second elongated sprocket hole 18 is encountered, the pawls 20 will pass through it without film engagement, and thereby terminate film advance in the same manner as did the single pawl upon engagement of the double length sprocket hole 17.

Formed on the trailing end 14 of the film 10, beyond the exposure advance termination portion just described in the direction of the supply reel end of the film 10, is a singularity generally designated 21 comprising a detent engaging element here shown as an aperture 22 formed in the film, adjacent which a projecting bump 23 is formed, as by pressure, heat and pressure, or the like. The singularity 21 thus comprises a hook adapted to engage a process control actuating element, as the film is moved in the direction of the takeup reel.

Formed on the leader end 11 of the film 10 is another detent engaging means, here shown as an aperture 24 in the central region of the film. This aperture serves to actuate a valve member forming a part of the processing apparatus in the cassette.

As shown, a number of legends are formed on the film, as by printing, embossing, punching, stamping or the like, to signal the state of the cassette to the user. These are each visible in the film gate of the cassette, as is the legend "UNEXPOSED" in FIG. 1, in a different stage of the operation and use of the cassette.

The film 10 is initially unexposed, with a portion of a region A visible in the film gate. The legend "UNEXPOSED" is formed in this region, on the non-emulsion of the film. Preferably, this legend is repeated one or more times, as shown in FIG. 2, to allow some tolerance in manufacture, as the initial position of the film is not critical to the operation of the cassette. Thus, even if the film is not always exactly in the same initial position, one of the legends "UNEXPOSED", or portions of two of them, will be visible to the user.

A region B of the film 10 is exposed in the film gate when advance of the film onto the takeup reel has been terminated in the camera by the drive pawl's encounter with the first elongated sprocket hole 17. The legend "EXPOSED" is formed on the film in the region B. The EXPOSED indication passes out of the film gate when advance of the film is continued to the second termination point established by the second elongated sprocket hole 18. At the second termination point, a region C is in the film gate. There is no need to form indicia in this region, because the cassette will be locked into the film drive and projection systems at times when the region C appears in the film gate.

When the film is rewound after it has been projected, it is wound onto the supply reel until the aperture 24 engages the valve member mentioned above and moves it into its final position. At that point, a region D is in the film gate, and rewind is terminated. The legend "DEVELOPED", or other legends such as "PROCESSED", of the same import, may be formed in the region D, to indicate that the film has been processed and is ready for projection. Alternatively, indicia in this region may be omitted, using the absence of the legends in the regions C and D as a sufficient indication of the state of the cassette.

Figure 5:
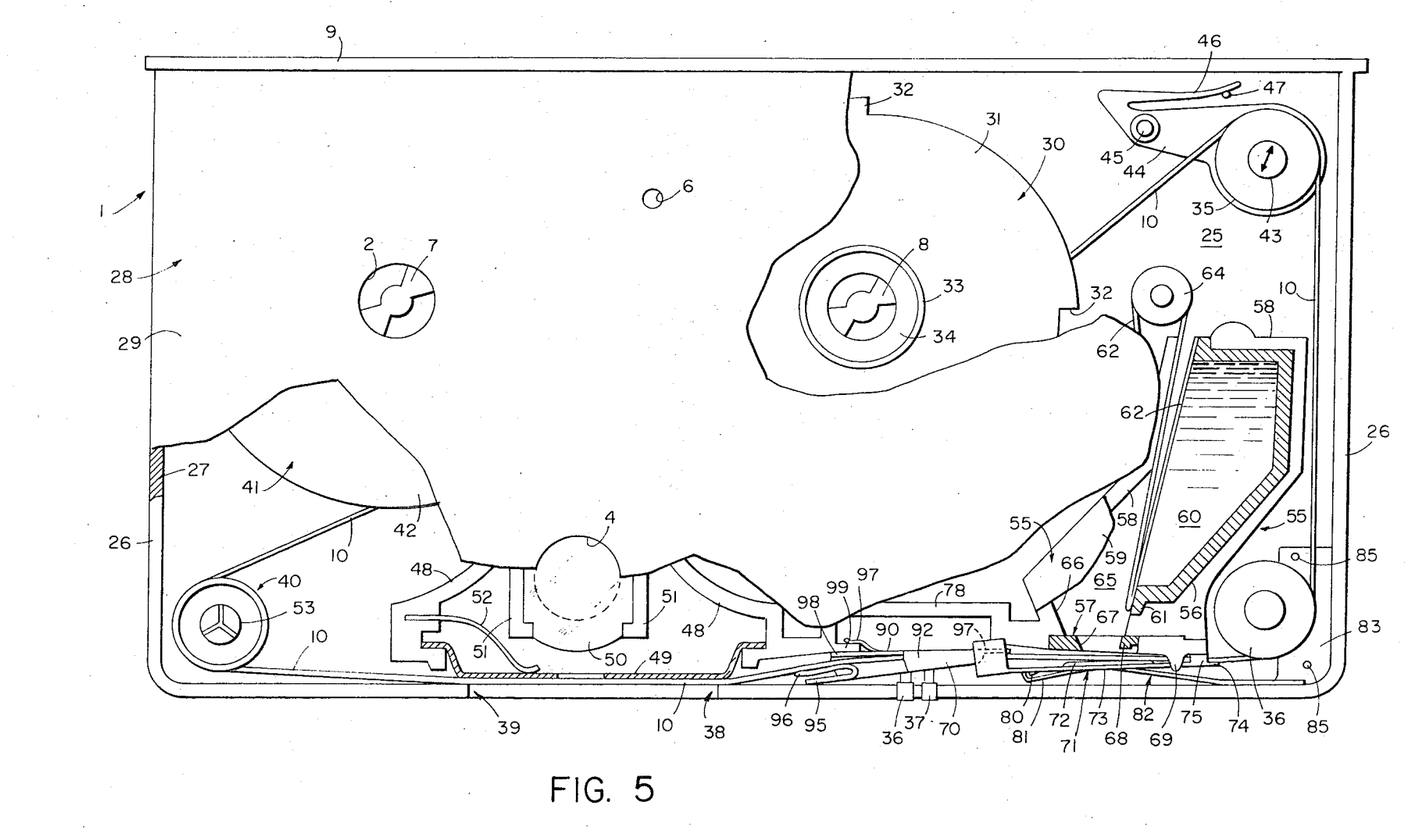
FIG. 5 is a schematic elevational view, on an enlarged scale, of the cassette of FIG. 1, with parts shown in cross-section and parts broken away.

FIG. 5 shows schematically the pertinent elements of an internally programmed cassette 1 adapted for use in the system of the invention. The cassette is fully described in the above-cited copending applications Ser. Nos. 227,080 and 227,092, to which reference is made for the details of its construction. Thus, it will be described here only to the extent necessary to understand the invention.

The cassette comprises a housing formed of any suitable opaque material such as metal, plastic, or the like, and preferably manufactured in two cooperating parts. As shown in FIG. 5, the housing parts comprise a base generally designated 25, having side walls 26. The walls 26 cooperate with interfitted walls 27 of a cover generally designated 28. The walls 27 overlap the corresponding segments of the walls 26 to form the sides of the housing of the cassette 1.

A cover plate 29 is formed integral with the walls 27, and completes the upper side of the housing as seen in FIG. 5. The selection of the parting lines between the walls 26 and 27 is a matter of convenience. In particular, the choice is preferably so made that the base 25 can serve as a support upon which all of the additional fixed and moving internal parts of the cassette may be assembled before the cover 28 is put in place. When the cover is placed in position, it may be formed integral with the base 25 and side walls 26 by heat sealing, or by a suitable adhesive, or the like.

The base and cover parts form, when assembled, the end flange 9 that serves to support and locate the cassette 1 in either a camera, or in the film drive and projection system described in the above-cited copending application Ser. No. 227,080.

Rotatably disposed within the housing of the cassette 1 is a supply reel generally designed 30. The reel 30 is provided with upper and lower flanges 31, to guide the film strip 10 as it is wound about the spool portion of the reel 30, to which the supply end of the film 10 is attached.

A bearing for the supply reel 30 is formed integral with the base 25, to journal the reel in the cassette housing for rotation about its central axis. Symmetrically disposed unidirectional teeth 32 are formed on the peripheries of the flanges 31 of the supply reel. These teeth are adapted to cooperate with an actuating arm, described in detail in the above-cited copending application Ser. No. 227,092, to effect the release of film processing composition in the manner there described.

A sprocket schematically indicated at 8 may be formed integral with the upper flange 31 of the reel 30 to adapt the reel to be driven about its axis of rotation. Access to the sprocket 8 is provided through the opening 3 in the cover plate 29 (FIG. 1), light-baffled by suitable conventional annular flanges such as 33, one formed on the cover plate 29, not shown, and a cooperating concentric one formed on the upper surface of the flange 31, as shown, and extending into cooperating recesses, such as the recess 34 formed in the flange 31, in the opposed parts.

The film 10 is initially in its unexposed state and coiled primarily about the supply reel 30. In its path from the supply reel 30, the film 10 first encounters a bobulator roll 35. The bobulator roll and its mounting assembly are preferably of the form shown and described in the above-cited copending application Ser. No. 227,080. The film engages a portion of the periphery of the bobulator roll, as shown, and passes therefrom around a conventional idler roll 36 journalled for rotation in the housing, and thence through a film processing station, to be described below. In addition to the apparatus for processing the film 10 in a manner to be described, the film processing station comprises a signal generator for producing an external condition signal on terminals schematically indicated at 36 and 37, to indicate whether or not the processing means has been actuated.

Beyond its path through the film processing station, the film 10 extends through a conventional light-baffled aperture schematically indicated at 38 and forming a portion of a film gate in the housing. The film 10 reenters the housing through a second light-baffled aperture generally designated 39 and comprising a second portion of the film gate. The film 1 next passes over a conventional snubber roll, generally designated 40, and finally passes to a takeup reel generally designated 41, comprising a spool portion to which the takeup reel end of the film is connected, and about which the film is wound as suggested in FIG. 5.

As shown in FIG. 5, in addition to parts corresponding to those described in connection with the supply reel 30, which may be identically duplicated for the takeup reel 41, the takeup reel comprises an external upper flange 42 protruding beyond the maximum radius of the film 10 when substantially stored on the takeup reel. On the flange 42 is formed the drive sprocket 7, by means of which the film can be selectively advanced in a manner to be described.

The bobulator roll 35 performs the known function of isolating the film drive pawl associated with a camera, or the double pawl discussed above that is associated with the film drive and projection system, from the inertia of the supply reel 30. For this purpose, the bobulator roll 35 is mounted on a pivot 43 that is in turn mounted on a support 44. The support 44 is pivoted to the base 25 as shown at 45 and is biased by an integrally formed spring 46, engaging a pin 47 fixed to the base 25, such that the bobulator roll 35 can both rotate, and be moved backwards and forwards in the directions of the double arrow shown in FIG. 5.

The bobulator roll thus responds to increases or decreases in the tension of the film 10 by temporarily shortening or lengthening the film path, respectively. Such changes in film tension are produced by the actuation of the film drive pawl and are determined by the inertial forces exerted by the supply reel 30, together with the larger or smaller supply of film that may be on it at any given time. By that arrangement, as the film is advanced incrementally by the pawl associated with the camera or projector, it can rapidly move the bobulator roll against its relatively light spring 46 without immediately affecting the supply reel, which can then more or less gradually allow the bobulator roll to relax while supplying the segment of film taken by the pawl.

A lighttight shield around the film gate formed by the apertures 38 and 39 is formed by a wall portion 48, formed integral with the base 25, and a pressure plate 49, to be described. The wall segments 48 are formed integrally with the cover 28 after assembly of the parts in the manner described above. An exposed chamber behind the portion of the film 10 in the film gate is thus formed for the purpose of admitting projection light.

The apparatus for this purpose is conventional, and will only briefly be described. In short, it comprises a prism generally designated 50 and comprising a mirror, not shown, but disposed at 45° to the plane of FIG. 5. As schematically indicated, the prism 50 is mounted between extensions 51 formed on the walls 48.

Light enters the cassette, through the port 4 formed in the cover plate 29, in directions normal to the plane of FIG. 5. The mirror in the prism 50 directs this light downwardly through the film 10 in the film gate for the projection of images on the film through a suitable lens assembly, to be described.

Also disposed in the chamber bounded by the wall member 48 and the film passing through the film gate is a conventional pressure plate 49, located between the prism and the film, and biased by a spring 52 into engagement with the film. The spring 52 is supported and retained by suitably shaped extensions of the support wall 48, as shown.

The pressure plate serves in the conventional manner to cooperate with the camera, by locating the focal plane of the film during exposure. A rectangular aperture is also provided in the pressure plate 49, as schematically indicated, to pass light entering through the prism assembly 50 through the film 10, after the film is processed in a manner to be described.

The snubber roll 40 may also be of entirely conventional construction. As illustrated, it is provided with a hub portion schematically indicated at 53 that is adapted to protrude through the (suitably light-baffled) aperture 5 in the cover panel 29 for engagement by a stop member, comprising a part of either the camera or of the film drive and projection system, that is engaged when the film is to be incrementally advanced by a pawl for exposure or projection purposes. The cooperation between the snubber roll 40 and the takeup reel 41 is conventional, but will be briefly described.

The drive sprockets 8 and 7 of the supply and takeup reels 30 and 41, respectively, are adapted to be engaged by corresponding drive sprockets comprising a part of a camera, or of the film drive and projection apparatus described in the above-cited copending application Ser. No. 227,080. In the film drive and projection apparatus, both supply and takeup reels are adapted to be driven through slip clutches. In the camera, only a drive for the takeup reel need be provided. This drive comprises a slip clutch connected to a sprocket driving the takeup reel drive sprocket 7, in cooperation with a drive pawl sequentially engaging a series of the sprockets 16 formed in the film 10, along a portion of the edge of the film in the film gate between the apertures 38 and 39.

When the snubber reel 40 is stopped by engagement of the hub 53 as described above, operation of either the camera or of the film drive and projection apparatus to incrementally advance the film towards the takeup reel, by engagement of a pawl with the sprocket holes in the film 10, will momentarily loosen the film from engagement with the stationary snubber roll 40 and allow the slip clutch driving the takeup reel 41 to take up that increment of the film advanced by the pawl. Between engagements of the pawl, the slip clutch prevents the takeup reel from advancing the film.

In the film drive and projection apparatus, the snubber roll 40 is engaged only while the film is to be incrementally advanced onto the takeup reel. When the film is rewound onto the supply reel, the snubber roll 40 is disengaged and acts an an idler. As will appear, that may occur either during the processing of the film while rewinding, or during subsequent rewinding of the processed film after projection.

The film processing station, fragmentarily shown in FIG. 5, will next be described. As there shown, the apparatus generally comprises wall means comprising portions of, or formed integral with, the base 25 and the cover plate 29 which serve to guide, support and house the various working elements of the processor. Generally speaking, these wall means comprise an outer film composition containing housing generally designated 55 and forming a chamber in which there is mounted an initially sealed container of processing composition 56. The container 55 communicates with a coating nozzle generally designated 57. These elements are mounted above the plane of the film 10.

More specifically, the outer container 55 comprises walls 58 formed integral with the base 25 and extending upwardly therefrom in FIG. 5. The walls 58 and base 25 form a container open on a side that is closed by a cover panel fragmentarily shown at 59 of the same general configuration as the region bounded by the walls 58 of the container 55.

The initially sealed container 56 for the processing composition comprises a tub-like receptacle, of a suitable plastic or the like, selected to resist interaction with the processing composition, or permeation thereof by ambient gases. The receptacle 56 initially contains a charge 60 of processing composition in an adequate amount to process the film 10.

The receptacle 56 is formed on an open side with a circumscribing flange 61 adapted to fit into corresponding cooperating recesses formed in the base 25 and a mating pair of cooperating recesses formed in the cover panel 29, not shown. As shown in FIG. 5, the flange 61 resets against shoulders formed on the wall 58.

The receptacle 56 is sealed to initially contain the processing composition 60 by one end of a tear-tab generally designated 62. The tear-tab 62 may be made of any suitable form of plastic, or the like, material, selected to resist the action of the composition 60 and to avoid interaction therewith, as well as to prevent the diffusion into the composition 60 of gases such as oxygen, carbon dioxide, carbon monoxide, water, oxides or hydrides of sulfur or nitrogen, or the like, that might modify its composition. As shown, one end of the tear-tab 62 is sealed to the plane surface of the flange 61 surrounding the opening formed on the receptacle 56, and within the flange area extending into the mounting recesses described above, by any suitable means such as heat sealing, a suitable adhesive, or the like.

The tear-tab 62 extends, from the end sealed to the receptacle 56, back upon itself, out through an aperture formed in the walls 58. From the aperture, the tear-tab passes over an idler 64, journalled in the housing, to an actuating assembly, described in detail in the above-cited copending application Ser. No. 227,092.

As more fully described in the above-cited copending application Ser. No. 227,092, an arm having a ledge adapted to be engaged by one pair of the teeth 32 on the flanges 31 of the supply reel 30 is connected to the end of the tear-tab 62 extending over the idler 64. The arm is initially held out of engagement with the teeth 32 by a detent that is released when a locating pin is inserted in the opening 6. When released, the arm is not affected by counter-clockwise rotation of the reel 30, but is engaged upon clockwise rotation (as seen in FIG. 5) to partially detach the tear-tab 62 from the container 56 and release the composition 60 to the coating nozzle 57.

Outside of the container comprising the receptacle 56 that is initially sealed by the tear-tab 62, the walls 58 of the outer container 55 define a chamber 65 into which the processing composition 60 can flow when the tear-tab 62 is partially detached from the receptacle 50 in the manner described above. The outer chamber 65 communicates with the coating nozzle 57 by way of a downwardly converging section 66 that communicates with a downwardly converging nozzle inlet passage 67 formed in the nozzle 57.

The coating nozzle 67 may be formed in a conventional manner, as by precision molding or the like, from a suitable thermoplastic resin selected to form a dimensionally stable and accurate molding whose working surfaces can be kept to close tolerances. These comprise a plane, generally U-shaped film engaging land on the base of the nozzle, and a doctor bar 68, lying across the bend of the U-shaped land, and recessed beneath it as shown in FIG. 5. The depth to which the doctor bar is recessed is greatly exaggerated in the drawing; it is selected to be twice the desired thickness to which the coating composition is applied to the film 10. The land and doctor bar circumscribe a generally rectangular outlet aperture formed in the nozzle and communicating with the downwardly converging passageway 67 through which the processing composition is received from the outer container 55, described above.

The nozzle 57 is provided at the sides with posts 69 that extend down past the sides of the film 10 to provide guidance for the film over the coating gap. These posts also serve at times to stop the nozzle closure plate portion of a cam and valve assembly 70, described fully in the above-cited copending applications, and to be described briefly below.

When the nozzle is engaged with the film in the manner to be described below, the film is adapted to pass over the nozzle outlet port and betweeen the posts 69, with the emulsion side of the film in engagement with the nozzle. During this engagement, coating takes place while the film moves, so that the emulsion surface leaves the coating aperture as it passes over the doctor bar 68 and carries with it a coating of processing composition established by the depth to which the bar 68 is recessed.

As more fully described in the above-cited copending applications, the processor further comprises a pressure pad generally designated 71. The pressure pad 71 is shown in FIG. 5 in the initial position assumed upon assembly of the cassette and prior to processing of the film 10.

As shown, the film 10 normally passes below the nozzle 57, and above a normally disengaged film engaging pad surface 72. The pad surface is formed on an upwardly extending and generally rectangular protrusion in a base plate 73. The pressure pad 71 may be made of any suitable conventional material, such as stainless steel or the like.

The raised surface 72 is adapted to mate, through the film 10, with the base of the nozzle 67.

The pressure pad 71 is formed with an end 74 that is adapted to lightly engage the base side of the film 10 in the initial position shown in FIG. 5, for purposes to appear. Formed adjacent the end 74 on the plate 73, and extending outwardly therefrom, are a pair of ears 75 adapted to extend up past the film 10 on either side and to initially engage the underside of the nozzle 57.

The pressure pad 71 is formed at its other end with a pair of upstanding ears 76 extending upwardly past the film on either side to initially engage a sloping ledge 77 formed in the lower side of an extension 78 of the walls 58. The extension 78 is formed integral with the base 25 and joins the walls 48 confining the exposure and projection station.

The base plate 73 of the pressure pad is divided into legs 79 extending on either side of a central portion bent to form a downwardly depending hook 80 that initially serves as a detent to hold the pressure pad 71 in an inactive position in the housing. For that purpose, the hook 80 is engaged in the initial position shown by an upwardly bent end 81 formed at the end of a spring 82.

The spring 82 comprises a base portion 83 that is cut out to clear the idler 36. The base portion 83 is secured to the base 25 by suitable fasteners, shown as a pair of screws 85.

From the base portion 83, a resilient spring arm 86 extends, in planes normal to the base, into engagement with the film engaging portion of the pressure pad 71, and hence to its termination 81 initially engaged with the hook 80.

The pressure pad depressing cam and nozzle closure plate assembly 70 comprises a plane central plate portion 90 having a protruding end 91 initially disposed between the ears 76 and adapted to be moved into a position covering the outlet port of the nozzle 57, in a manner to appear, to close the nozzle at the end of the processing operation.

Formed as orthogonal extensions on the side of the central plate 90 are a pair of cams 92 and 93 that serve at times to depress the pressure pad, described above, in a manner to appear below. The cam 92 is shorter than the cam 93, to facilitate threading of the film 10 during assembly of the cassette.

Toward the left end of the plate 90 the cam 93 is formed with a normally extending arm that extends generally parallel to the plate 90 and is formed integral with a hook comprising a pair of spring arm extensions 95 and 96. These arm extensions 95 and 96 taper away from each other towards the ends, to allow the entry of a film aperture in a manner to appear.

A central portion 97 of the plate 90 is bent upwardly and away from the surrounding portions 98 to form a hook having as its upper portion the extension 97 and as its lower portions the portions 98. These hook elements initially engage a ledge portion 99 formed integral with the base 25 to hold the assembly 70 in the position shown. In that position, the cams 92 and 93 extend into and are guided by the ears 76 formed on the pressure pad 71, and the nozzle closing plate end 91 of the assembly 70 confronts but does not engage a downwardly sloping guide ledge 100 formed on the wall extension 78 referred to above.

The upper spring arm 96, of the hook comprising that arm and the lower arm 95 formed on the assembly 70, lightly engages the base of the film 10 in the initial position of the parts shown in FIG. 5. The upwardly bent end of the arm 96 thus serves as a unidirectional detent that is adapted to engage an aperture in the film, in a manner to be described below, towards the end of the processing cycle to be described.

The cam portion 93 of the assembly 70, of metallic conducting material, cooperates with a pair of contacts formed integrally with the external terminals 36 and 37, as shown in FIG. 5, to form a signal generator indicating whether or not the film 10 has been processed. For this purpose, in the initial position of the parts shown in FIG. 5 and assumed before the processing cycle is started, the cam 93 bridges both terminals 36 and 37 to supply an external signal which indicates that the film is not processed. As will appear, at the end of the processing cycle, the assembly 70 will be carried to the right in FIG. 5, opening the circuit path between the terminals 36 and 37 to cause an open circuit to be presented by the terminals, indicating that the film has been processed.

Having described one embodiment of the cassette of the invention, its operation will next be described.

As manufactured and supplied to the user, the film 10 is unexposed and disposed primarily on the supply reel with the legend "UNEXPOSED" visible in the film gate as shown in FIG. 1. The cassette in that state is placed in the camera, where the film is exposed as the film is incrementally advanced onto the takeup reel. When the first elongated sprocket hole 17 is encountered, the exposure process is terminated. When the cassette is withdrawn from the camera, the legend "EXPOSED" is visible in the film gate.

Next, assume that the cassette is inserted into a film drive and projection system of the type shown and described in the above-cited copending application Ser. No. 227,080. If the cassette is of the form here shown, and as fully described in the above-cited copending application Ser. No. 227,092, the film drive and projection apparatus of application Ser. No. 227,080 would require a minor modification in construction consisting in mounting the locating pin and its latching and withdrawl mechanism in position to enter the recess 6 when located between the drive sprockets as shown in FIG. 1, rather than to the right of the supply reel as shown in application Ser. No. 227,080. Otherwise, the construction would be identical. Alternatively, if the cassette incorporated the tear-tab release mechanism of application Ser. No. 227,080, the film drive and projection system of that application could be used without modification.

As described in the above-cited copending application Ser. No. 227,080, when the cassette is inserted into the pocket of the film drive and projection system, a locating pin enters the recess 6, latching the cassette into position and enabling the tear-tab release mechanism. Drive sprockets engage the takeup reel drive sprocket 8, and a snubber roll stop enters the recess 5 and engages the hub 53 of the snubber roll 40 (FIG. 5).

A dual film advance pawl such as 20 in FIG. 4 sequentially engages the sprocket holes 17 and 16, incrementally advancing the film until the second elongated sprocket hole 18 is encountered. That will cause counterclockwise rotation of the supply reel 30, as seen in FIG. 5. Rotation in that direction will not cause the tear-tab 62 to be detached from the receptacle 56, because the teeth 32 are ineffective to engage the actuating arm that is concerned to the tear-tab.

FIG. 5 shows the parts of the processing apparatus in their initial position, which is maintained during exposure of the film and during the first increment of motion just described from the exposure termination point to the second termination point in which the film is substantially exhausted from the supply reel. In that position, the cam and nozzle closure plate assembly 70 is held in place by engagement of the arms 97 and 98 with the ledge 99, and the upper resilient arm 96 of the film engaging hook formed on the assembly 70 is lightly engaging the base of the film 10.

The pressure pad 71 is initially held in place by engagement of its hook 80 with the detent 81 formed on the spring 82. In that position, the end 74 of the pressure pad 71 is lightly engaging the base of the film 10, and the ears 76 are in engagement with the ledge 77 formed on the wall segment 78.

The parts will remain in the position shown in FIG. 5 until, during the further advance of the film 10 towards the takeup reel, the film engaging hook 23 approaches and engages the end 74 formed on the pressure pad 71. When that occurs, near the second termination point established by the second elongated hole 18 in the film (FIG. 2), the hook 23 will move the pressure pad to the left in FIG. 5, to a position in which the ears 76 have moved out of engagement with the ledge 77, and upwardly under the influence of the spring 82. The pressure pad 71 will swing up into engagement with the film 10 and carry the emulsion side of the film into coating engagement with the nozzle 57.

As the pressure pad 71 is moved to the left, the detent 81 formed on the spring 82 will be disengaged by the hook 80. The purpose of the detent 81 is primarily to prevent premature movement of the pressure pad 71 in the housing prior to its positive disengagement from the initial position shown in FIG. 5 by the hook 23.

Next, assume that the first rewind operation is begun. That is accomplished in a lighttight environment, as described in the above-cited copending application Ser. No. 227,080, with the snubber roll disengaged and serving as an idler. The supply reel 30 will be continuously rotated clockwise in FIG. 5, thereby enabling the first of the teeth 32 to actuate the tear-tab release mechanism and partially detach the tear-tab 62 from the receptacle 56. As this motion of the supply reel is begun, it will bring the hook 23 out of engagement with the end 74 of the pressure pad 71.

The processing composition 60 will now flow down into coating engagement with the nozzle 57 and the film 10. The composition will then be uniformly coated on the emulsion side of the film 10 to a thickness determined by the doctor bar 68.

A doctor bar coater is preferred to other conventional forms of coaters for the purpose of coating the film, because it is inherently insensitive to changes in the viscosity of the processing composition, and to changes in linear film speed with respect to the doctor bar, over a reasonable range that makes the process relatively insensitive to these variables. In particular, as is well known in the art in other contexts, a doctor blade or doctor bar coater inherently will lay down a uniform coating of one-half the distance between the doctor bar and the coated substrate under conditions in which a uniform meniscus can be formed on the coating liquid adjacent its interface with the substrate.

The coating operation will continue until the composition 60 is substantially exhausted and the film is stored substantially all on the supply reel 30. Toward the end of that operation, the legend "UNEXPOSED" will pass through the film gate and back into the housing. The aperture 24 (FIG. 2) will then approach and engage the hook finger 96 formed on the valve and cam assembly 70.

As the film 10 continues to move onto the supply reel, engagement of the aperture 24 in the film with the spring arm 96 will carry the film along the arm and downwardly into the bight formed between the arms 95 and 96. Further movement of the film 10 towards the supply reel will carry the cam and valve member 70 to the right of the position shown in FIG. 5, causing the spring arms 97 and 98 to disengage the ledge 99, and bringing the cams 92 and 93 into contact with the base plate 73 of the pressure pad 71.

During this movement, the end 97 of the cam and valve assembly 70 is guided by the surface 100 formed on the wall extension 78 of the housing, and moves below the nozzle 57 towards a nozzle closing position. The pressure pad 71 begins to move downwardly, out of engagement with the film 10. The film is still held down out of its normal plane of movement by engagement with the bight formed between the spring arms 95 and 96.

Movement in this direction will continue to move the assembly 70 to the right in FIG. 5, as it goes to a position in which the end 97 of the valve assembly 70 closes the nozzle 57.

During its movement from the position shown in FIG. 5 to the final position just described the cam 93 disengages the terminals 36 and 37. That provides a signal indicating that the film has been processed.

When the valve assembly is in its closed position, the film will stop. As described in the above-cited copending application Ser. No. 227,080, the film drive and projection apparatus will then project the images just processed on a viewing screen while incrementally advancing the film onto the takeup reel.

The dual drive pawl in the film drive and projection system will advance the film past the first elongated sprocket hole 17, drawing the legends "UNEXPOSED" through the film gate and back into the housing of the cassette. Film advance is terminated when the second elongated sprocket hole 18 is encountered.

Next, the supply reel 30 will be driven to rewind the film until the end of the film on the takeup reel is encountered. When that occurs, as described in the above-cited copending application Ser. No. 227,080, the cassette will be ejected for retrieval by the user. The legend "DEVELOPED" will now be visible in the film gate, indicating that the cassette is in condition for projection.

While the invention has been described with reference to the particular details of preferred embodiments, many changes and variations will occur to those skilled in the art upon reading this description, and such can obviously be made without departing from the scope of the invention.

Having thus described the invention, what is claimed is:

1. A film strip provided with a regularly spaced series of sprocket holes adapted to cooperate with a film advance mechanism formed along at least one edge thereof, a first elongated sprocket hole of a first length interrupting said series adjacent a first end of said strip, a second elongated sprocket hole of a second length greater than said first length interrupting said series between said first end and said first elongated sprocket hole, and means forming indicia on said film between said first and said second elongated sprocket holes and indicating that said strip is exposed.

2. The film strip of claim 1, further comprising an actuating element formed on said film between said second elongated sprocket hole and said first end.

3. A photographic film strip for use in motion picture photography, said film strip comprising an elongated strip of flexible photosensitive material sprocketed along at least one edge for incremental advance by a drive pawl, means forming a first actuating element on said strip adjacent a first end of said strip, means forming a second actuating element on said strip adjacent a second end of said strip opposite said first end, means forming first indicia on said strip indicating that the strip is unexposed adjacent said first actuating element and between said actuating elements, and means forming second indicia on said strip indicating that said strip is exposed adjacent said second actuating element and between said actuating elements.

4. The film strip of claim 3, further comprising means forming third indicia on said strip indicating that said strip has been processed between said first end and said first actuating element.

5. A photographic cassette, comprising an opaque housing, a supply reel and a takeup reel each rotatably mounted in said housing, means forming a film gate in said housing, a strip of film having opposed ends, a first of said ends being connected to said supply reel, the second of said ends being connected to said takeup reel, said film strip passing along a path between said reels through said film gate, first actuating means formed on said film strip adjacent said first end, second actuating means formed on said film strip adjacent said second end, means forming first indicia visibly indicating that said film strip is unexposed at a first location on said film strip adjacent said second actuating means and between said first actuating means and said second actuating means, means forming second indicia visibly indicating that said film strip is exposed at a second location on said film strip adjacent said first actuating means and between said first actuating means and said second actuating means, said film strip being initially unexposed and coiled primarily about said supply reel with said first indicia visibly exposed in said film gate, film processing means mounted in said housing along said path, means operated by said first actuating means when said first actuating means reaches the position of said processing means along said path for engaging said processing means with said film strip, said second indicia passing through said film gate as said first actuating means approaches the position of said processing means, and means operated by said second actuating means when said second actuating means reaches the position of said processing means along said path for disengaging said processing means from said film strip; said second indicia passing through said film gate as said second actuating means approaches the position of said processing means.

6. The cassette of claim 5, in which said film strip further comprises a regularly spaced series of sprocket holes formed along at least one edge of said strip for cooperation with a drive pawl to advance said film strip incrementally onto said takeup reel, said series being interrupted in the vicinity of said second indicia by a first elongated sprocket hole adapted to pass a single drive pawl without engagement to terminate movement of said film toward said takeup reel by a single pawl with said second indicia visibly exposed in said film gate, and said series being interrupted by a second elongated sprocket hole adapted to pass a double drive pawl without engagement to terminate movement of said film strip toward said takeup reel by a double pawl with said second actuating means operatively engaging said means for disengaging said processing means and said second indicia in said housing.

7. The cassette of claim 6, further comprising means forming third indicia visibly indicating that said film strip has been processed at a third location on said film strip adjacent said second end and between said second end and said second actuating means in position to be visibly exposed in said film gate when said second actuating means reaches the position of said processing means.

8. The cassette of claim 5, further comprising means forming third indicia visibly indicating that said film strip has been processed at a third location on said film strip adjacent said second end and between said second end and said second actuating means in position to be visibly exposed in said film gate when said second actuating means reaches the position of said processing means.

9. A photographic cassette, comprising an opaque housing, means forming a film gate in said housing, an elongated strip of film having ends disposed in said housing and extending therebetween along a path through said film gate, film processing means mounted in said housing along said path and actuatable to a position operatively engaging said film strip and to a position out of engagement with said film strip, means forming a first actuating element on said film strip adjacent a first of said ends for actuating said processing means to its film engaging position when said first actuating element reaches the position of said processing means along said path, means forming a second actuating element on said film strip adjacent the second of said ends for actuating said processing means to its disengaged position when said second actuating element reaches the position of said processing means along said path, means forming first indicia at a first location on said film strip, said first indicia being visible in said film gate when said first location passes through said film gate and indicating that said film strip is unexposed, said first location being between said first and said second actuating elements and adjacent said second actuating means, means forming second indicia at a second location on said film strip, said second indicia being visible in said film gate when said second location passes through said film gate and indicating that said film strip is exposed, said second location being between said actuating elements and adjacent said first actuating element.

10. The apparatus of claim 9, further comprising means forming third incicia on said film strip indicating that said film has been processed between said second actuating element and said second end and visible in said film gate when said second actuating element reaches the position of said processing means along said path.

11. In combination with a film cassette comprising an opaque housing, a takeup reel and a supply reel rotatably mounted in said housing, a strip of film having opposed ends, a first of said ends being connected to said supply reel and the second of said ends being connected to said takeup reel, means forming a film gate in said housing, said film passing between said reels through said film gate for cooperation with a camera, for exposure of said film, and with projection means, for projection of said film, said film being initially disposed primarily on said supply reel with a first portion in said film gate, first indicia means on said first portion for indicating visually that the film is unexposed when said first portion is in said film gate, said film being formed over at least a substantial portion of its length with a regularly spaced series of sprocket holes for moving said film incrementally from said supply reel by increments approximating the spacing between said sprocket holes, said series being interrupted at a first location adjacent said first end of said film by means forming a first elongated sprocket hole for terminating exposure of the film in a camera adjacent said first location, said series being interrupted at a second location nearer to said first end of said film than said first location by means forming a second sprocket hole more greatly elongated than said first elongated sprocket hole for terminating projection of the film in a projection means adjacent said second location, and second indicia means for indicating visually that the film has been exposed on said film adjacent said first elongated sprocket hole in position to be visible in said film gate in the position of the film assumed when film motion in the cassette is terminated in the camera and to be moved out of said film gate when projection of the film is terminated adjacent said second location.

12. In combination with a film cassette comprising a lighttight housing, a takeup reel and a supply reel rotatably mounted in said housing, a strip of film having opposed first and second ends, said first end being connected to said supply reel and said second end being connected to said takeup reel, means forming a film gate in said housing, said film passing between said reels through said film gate for cooperation with a camera, for exposure of said film, and with projection means, for projection of said film, means forming first indicia on said film indicating that said film is unexposed at a location visible in said film gate when said film is substantially coiled on said supply reel, said film being formed over at least a substantial portion of its length with a regularly spaced series of sprocket holes each adapted to cooperate with a first incremental film advance means on a camera to move the film from said supply reel to said takeup reel by an increment approximating the spacing between said sprocket holes, said series being interrupted at a first location adjacent the end of said film connected to said supply reel by means forming an elongated sprocket hole having a length sufficient to admit a first incremental advance means without advancing the film, whereby exposure of the film in the camera is terminated adjacent said first location, means forming second indicia on said film indicating that said film is exposed at a location visible in said film gate when said film is in the positon established by said elongated hole, said series and said elongated hole each being adapted to cooperate with a second intermittant advance means on a projection means to move the film from said supply reel to said takeup reel by an increment approximating the spacing between the sprocket holes of said series, whereby the film may be advanced by the projection means beyond the exposure termination point established by said elongated sprocket hole, film processing means mounted in said housing, and means forming an actuating element on said film at a location adapted to engage said processing means when said film is advanced from said supply reel beyond said exposure termination point, said film processing means being responsive to engagement by said actuating element to operatively engage said film.

13. The apparatus of claim 12, further comprising means forming third indicia on said film indicating that said film has been processed at a location visible in said film gate subsequent to said actuating element engaging said processing means.

14. In combination with a film cassette comprising a housing containing a strip of film having first and second ends connected to supply and takeup means, respectively, each of said supply and takeup means being adapted to store substantially all of the film and to exchange film one with the other, means forming a film gate in said housing, said film passing over a predetermined path through said film gate between said supply and takeup means, film processing means located in said housing adjacent said path and comprising coating means engageable with the film and effective when engaged and supplied with processing composition to coat said film with processing composition as said film is moved along said path, means forming first indicia on said film adjacent said first end indicating that said film is exposed, means forming a first actuating element on said film between said first indicia and said first end, said first actuating element engaging said processing means as said film moves toward said takeup means when substantially all of said film is stored by said takeup means thereby bringing said film into operative engagement with said processing means, means forming second indicia on said film adjacent said second end indicating that said film is unexposed, means forming a second actuating element on said film between said second indicia and said second end, disengaging means operated by said second actuating element as said film moves toward said supply means when substantially all of said film is stored by said supply means for disengaging said processing means from said film, said film being initially unexposed and primarily stored on said supply means with said second indicia located in said film gate, and means on said film for cooperating with advance means to incrementally advance said takeup reel to a position in which said first indicia is located in said film gate.

15. In combination, a film cassette comprising an opaque housing; means forming a film gate in said housing; a strip of film having opposed ends located in said housing and extending therebetween over a path through said film gate; first film transport means, comprising film takeup means mounted in said housing and connected to one of said ends, and incremental advance means formed on said film; said first film transport means being responsive to selectively applied drive energy to advance said film incrementally onto said takeup means to a first position relative to said housing; means forming first indicia on said film indicating that said film is exposed at a location on said film that is visible in said film gate in said first position of said film; second film transport means, comprising film supply means mounted in said housing and connected to the other of said ends; said second film transport means being responsive to selectively applied drive energy to continuously return film from said film takeup means to said film supply means to a second predetermined film position relative to said housing; means forming second indicia on said film indicating that said film is unexposed at a location on said film that passes through said film gate as said film approaches said second position; processing means mounted in said housing adjacent said path and effective when actuated to apply processing composition to said film; and actuating means formed on said film and located thereon in position to actuate said processing means when said film is advanced to said first position toward said takeup means and then returned to said supply means; said film being initially positioned in said housing with said second indicia visible in said film gate.

16. A compact multipurpose film handling cassette comprising a substantially opaque housing, an elongated strip of material stored within said housing, said elongated strip of material comprising an elongated strip of photosensitive material, first means for facilitating the exposure of an incremental section of said elongated strip of photosensitive material to record an image thereon and for subsequently facilitating the direction of light rays from an externally mounted projection lamp through an incremental section of said elongated strip of photosensitive material for viewing purposes, second means for applying a processing fluid to an incremental section of said elongated strip of photosensitive material after exposure thereof, third means responsive to externally mounted actuating means for first progressively advancing substantially the entire length of said elongated strip of photosensitive material into operative relationship with said first means to effect its exposure, then for progressively advancing substantially the entire length of said elongated strip of exposed photo-sensitive material into operative relationship with said second means and for finally progressively advancing substantially the entire length of said elongated strip of fluid treated exposed photosensitive material into operative relationship with said first means for viewing purposes, and fourth means automatically responsive to the advancement of said elongated strip of photosensitive material for providing, when said third means is operably disassociated from such externally mounted actuating means, a visual indication discernible from a position externally of said housing as to when substantially the entire length of said elongated strip of photosensitive material is in an unexposed condition, as to when the exposure of substantially the entire length of said elongated strip of photosensitive material has been completed and as to when the fluid treatment of substantially the entire length of said elongated strip of exposed photosensitive material has been completed.

17. In combination, a film cassette comprising an opaque housing; a strip of film having opposed ends located in said housing; first film transport means, comprising film takeup means mounted in said housing and connected to one of said ends, and incremental advance means formed on said film; said first film transport means being responsive to externally mounted actuating means to advance said film incrementally onto said takeup means to a first position relative to said housing; second film transport means, comprising film supply means mounted in said housing and connected to the other of said ends; said second film transport means being responsive to externally mounted actuating means to continuously return film from said film takeup means to said film supply means to a second predetermined film position relative to said housing; third means for facilitating the exposure of an incremental section of said strip of film to record an image thereon and for subsequently facilitating the direction of light rays from an externally mounted projection lamp through an incremental section of said strip of film for viewing purposes, processing means mounted in said housing adjacent said path and effective when actuated to apply processing composition to said film; actuating means formed on said film and located thereon in position to actuate said processing means when said film is advanced to said first position toward said takeup means and then returned to said supply means; and fourth means automatically responsive to the advancement of said strip of film for providing, when said first and said second film transport means are operably disassociated from such externally mounted actuating means, a visual indication discernible from a position externally of said housing as to when substantially the entire length of said strip of film is in an unexposed condition, as to when the exposure of substantially the entire length of said strip of film has been completed and as to when the fluid treatment of substantially the entire length of said strip of exposed film has been completed.

* * * * *